United States Patent [19]

Hibi et al.

[11] Patent Number: 4,893,798
[45] Date of Patent: Jan. 16, 1990

[54] FLUID-FILLED ELASTIC BUSHING HAVING MEANS FOR LIMITING ELASTIC DEFORMATION OF AXIAL END PORTIONS OF ELASTIC MEMBER DEFINING PRESSURE-RECEIVING CHAMBER

[75] Inventors: Masayuki Hibi, Komaki; Nobuo Matsumoto, Nagoya; Yoshiki Funahashi, Iwakura, all of Japan

[73] Assignee: Tokai Rubber Industries, Ltd., Aichi, Japan

[21] Appl. No.: 279,794

[22] Filed: Dec. 5, 1988

[30] Foreign Application Priority Data

Dec. 7, 1987 [JP] Japan .................................. 62-309292

[51] Int. Cl.$^4$ ......................... F16M 5/00; F16M 13/00
[52] U.S. Cl. .................... 267/140.1; 248/562
[58] Field of Search ...................... 267/140.1, 219, 35, 267/113, 281, 282, 293, 141.2–141.5, 140.1 C; 248/562, 609, 636, 638; 180/312, 300; 123/192 R, 195 A

[56] References Cited

U.S. PATENT DOCUMENTS 4,749,173 6/1988 Kanda .............................. 267/140.1
4,749,174 6/1988 Kanda .............................. 267/140.1

FOREIGN PATENT DOCUMENTS 2703038 7/1978 Fed. Rep. of Germany ... 267/141.2
0211140 10/1985 Japan ................................. 267/140.1
0261730 11/1987 Japan ................................. 267/140.1
0261731 11/1987 Japan ................................. 267/140.1

*Primary Examiner*—Robert J. Oberleitner
*Attorney, Agent, or Firm*—Oliff & Berridge

[57] ABSTRACT

A fluid-filled elastic bushing including an inner sleeve and an outer sleeve disposed radially outwardly of the inner sleeve, an elastic member elastically connecting the inner and outer sleeves, so as to provide an assembly having a plurality of fluid-filled chambers which are spaced apart from each other in a circumferential direction of the sleeves and an orifice for fluid communication between the chambers, and a wing member disposed in at least one pressure-receiving chamber of the fluid chambers to which a vibrational load is applied. The wing member is supported by one of the sleeves and the elastic member, and cooperates with the assembly to define a restricted portion within the pressure-receiving chamber. A restrictor member is fixedly disposed so as to extend in the elastic member in an axial direction of the elastic bushing, for limiting axial elastic deformation of axial end portions of the elastic member which define opposite ends of the pressure-receiving chamber as viewed in the axial direction of the elastic bushing.

7 Claims, 2 Drawing Sheets

FLUID-FILLED ELASTIC BUSHING HAVING MEANS FOR LIMITING ELASTIC DEFORMATION OF AXIAL END PORTIONS OF ELASTIC MEMBER DEFINING PRESSURE-RECEIVING CHAMBER

BACKGROUND OF THE INVENTION

1. Field of the Invention

The present invention relates generally to a cylindrical fluid-filled elastic bushing adapted to isolating or damping vibrations, primarily the vibrations applied thereto in a radial direction thereof, and more particularly to such a fluid-filled elastic bushing capable of effectively damping low-frequency vibrations and effectively isolating medium- and high-frequency vibrations.

2. Discussion of the Prior Art

There is known a generally cylindrical fluid-filled elastic bushing for elastically connecting two members of a vibration system, such that vibrations applied to the bushing in its radial direction are particularly effectively damped or isolated. Examples of such an elastic bushing include suspension bushings for automotive vehicles, and cylindrical engine mounts for mounting an engine on the body of front-engine front-drive vehicles.

For instance, the assignee of the present application developed a fluid-filled elastic bushing as disclosed in U.S. Pat. Nos. 4,749,173 and 4,749,174, which includes (a) an inner sleeve, (b) an outer sleeve disposed radially outwardly of the inner sleeve, (c) an elastic member formed between and elastically connecting the inner and outer sleeves, so as to provide an assembly having a plurality of fluid chambers which are spaced apart from each other in a circumferential direction of the sleeves and are filled with a non-compressible fluid, the assembly further having orifice means for fluid communication between the fluid chambers, and (d) a wing member disposed in at least one of the plurality of fluid chambers to which a vibrational load is applied. The wing member is supported by one of the inner and outer sleeves and the elastic member, and cooperates with the assembly to define a restricted portion within each of the above-indicated at least one fluid chamber (hereinafter referred to as pressure-receiving chamber).

In the fluid-filled elastic bushing constructed as described above, low-frequency vibrations applied to the inner and outer sleeves are excellently damped based on a resistance of the orifice means to flows of the fluid therethrough or on resonance of masses of the fluid in the fluid chambers when the fluid is forced to flow between the fluid chambers through the orifice means, due to changes in the fluid pressures in the fluid chambers, which arise from changes in the volumes of the fluid chambers upon elastic deformation of the elastic member due to displacement of the inner and outer sleeves relative to each other. Upon application of medium- and high-frequency vibrations, on the other hand, the orifice means is placed in a substantially closed state, and the vibrations are effectively isolated based on a resistance of the restricted portion of the pressure-receiving chamber to the fluid flows therethrough or on resonance of the fluid masses in two sections of the pressure-receiving chamber which communicate with each other through the restricted portion. Namely, the restricted portion of the pressure-receiving chamber contributes to lowering the spring constant or vibration transmissibility of the bushing as a whole when the bushing receives the medium- or high-frequency vibrations.

However, the axial end portions of the elastic member which define opposite ends of the pressure-receiving chamber as viewed in the axial direction of the bushing tend to be easily elastically deformed in the axial direction upon application of vibrations to the assembly, since it is generally difficult to construct the assembly such that the axial end portions of the elastic member have a sufficiently large wall thickness.

Usually, the fluid-filled elastic bushing indicated above is installed such that the pressure-receiving chamber formed in the elastic member between the inner and outer sleeves extends in the direction perpendicular to the load-receiving direction in which the vibrational load is applied. In other words, where the elastic bushing is used as a vehicle engine mount, the bushing is installed such that the weight of the engine acts on the bushing as a static or initial load, in the load-receiving direction. This static load causes a certain amount of elastic deformation of the axial end portions of the elastic member, even when no vibrational or dynamic load is applied to the bushing.

The elastic deformation of the axial end portions of the elastic member which define the opposite ends of the pressure-receiving chamber indicated above results in a change in the size of the restricted portion of the pressure-receiving chamber, which is partially defined by the wing member disposed therein. The restricted portion is tuned to a given range of frequency of the vibrations desired to be damped. That is, the size and configuration of the restricted portion are adjusted to effectively isolate a medium- and high-frequency range of vibrations. However, the deformation of the axial end portions of the elastic member causes a change in the tuned frequency range of the vibrations, resulting in reduced capability of the elastic bushing to isolate the medium- and high-frequency vibrations.

SUMMARY OF THE INVENTION

It is therefore an object of the present invention to provide a fluid-filled elastic bushing wherein the axial end portions of an elastic member which define the opposite ends of a pressure-receiving fluid chamber as viewed in an axial direction of the elastic bushing are suitably protected against elastic deformation due to application of static and dynamic loads thereto.

The above object may be achieved according to the principle of the present invention, which provides a fluid-filled elastic bushing for damping or isolating a vibrational load, comprising: (a) an inner sleeve and an outer sleeve disposed radially outwardly of the inner sleeve; (b) a generally annular elastic member formed between and elastically connecting the inner and outer sleeves, so as to provide an assembly having a plurality of fluid chambers which are spaced apart from each other in a circumferential direction of the sleeves and are filled with a non-compressible fluid, the assembly further having orifice means for fluid communication between the fluid chambers; (c) a wing member disposed in at least one of the plurality of fluid chambers to which the vibrational load is applied, the wing member being supported by one of the inner and outer sleeves and the elastic member, the wing member cooperating with the assembly to define a restricted portion within each of the at least one fluid chamber; and (d) a restrictor member fixedly disposed so as to extend in a portion of the elastic member in an axial direction of the elastic bushing, for limiting or restricting axial elastic deformation of the elastic member at axial end portions thereof which define opposite ends of each fluid chamber as viewed in the axial direction of the elastic bushing.

In the fluid-filled elastic bushing of the present invention constructed as described above, the restrictor member fixedly disposed in the elastic member serves to effectively limit or restrict the elastic deformation of the axial end portions of the elastic member in the axial direction, upon application of static and dynamic loads to the inner and outer sleeves. Accordingly, when the static load and the dynamic vibrational load are applied to the elastic bushing, the restrictor member minimizes the amounts of change in the size and configuration of the restricted portion of the pressure-receiving chamber which is defined by the periphery of the wing member and the opposite surfaces of the assembly defining the pressure-receiving chamber.

Where the instant elastic bushing is utilized as an engine mount for a motor vehicle, the static or initial load, i.e., the weight of a vehicle engine acting on the engine mount does not cause appreciable amounts of change in the size and configuration of the restricted portion of the pressure-receiving chamber, namely, does not cause a significant adverse influence on the vibration isolating characteristic or capability of the bushing which is based on the fluid flows in the pressure-receiving chamber, through the restricted portion. Thus, the instant elastic bushing provides a highly stable vibration isolating effect with respect to the input vibrations in a predetermined frequency range.

Further, the restrictor member is effective to protect the axial end portions of the elastic member against excessive deformation or strain due to a vibrational load having a large amplitude, whereby the durability of the elastic member and the life expectancy of the elastic bushing as a whole can be significantly improved.

The restrictor member may be suitably formed of an elastic material having a higher hardness than the elastic member.

In one form of the invention, the restrictor member has radially outward flanges at opposite axial ends thereof, and extends through the elastic member such that the outward flanges are held in contact with the outer surfaces of the axial end portions of the elastic member.

In another form of the invention, the plurality of fluid chambers include an equilibrium chamber in addition to the pressure-receiving chamber in which the wing member is disposed. The equilibrium chamber is partially defined by a flexible diaphragm, so that the volume of the equilibrium chamber is variable when the fluid flows between the pressure-receiving chamber and the equilibrium chamber. In this case, the equilibrium chamber may preferably be located opposite to the pressure-receiving chamber diametrically of the inner sleeve. Further, the elastic member may have a void formed between the pressure-receiving chamber and the outer sleeve as viewed in a direction in which the vibrational load is applied to the pressure-receiving chamber. In this instance, the restrictor member may be suitably disposed in a portion of the elastic member which is located between the pressure-receiving chamber and the void.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
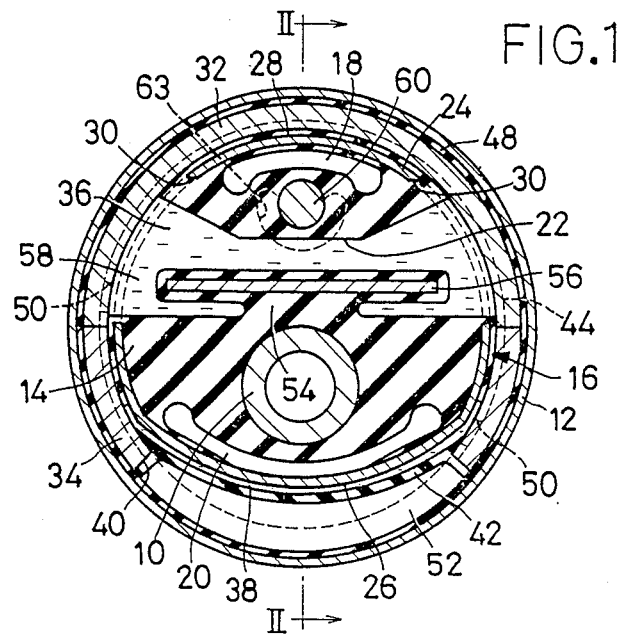
FIG. 1 is an elevational view in transverse cross section of one embodiment of a fluid-filled elastic bushing of the present invention, in the form of an engine mount for a motor vehicle.
Figure 2:
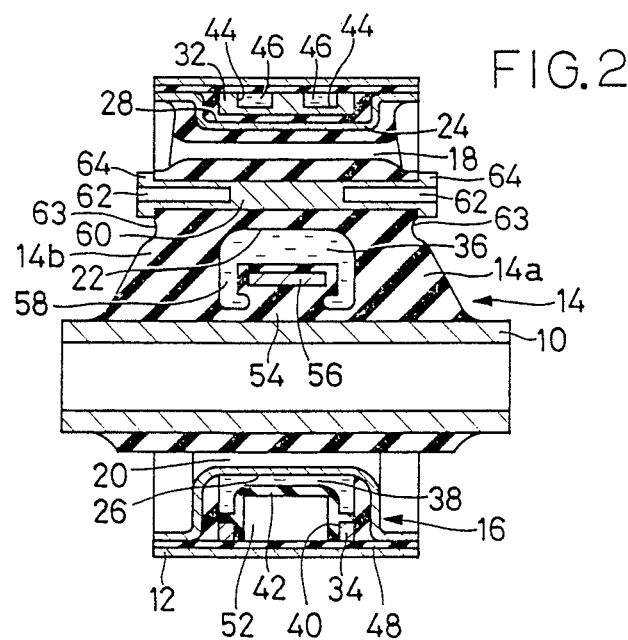
FIG. 2 is an elevational view in axial cross section of the engine mount of FIG. 1, taken along line II—II of FIG. 1.

Referring to FIGS. 1 and 2, there is shown the fluid-filled cylindrical elastic bushing in the form of a cylindrical engine mount for a front-engine front-drive motor vehicle. In these figures, reference numerals 10 and 12 respectively denote an inner metal sleeve, and an outer metal sleeve disposed radially outwardly of the inner sleeve such that the two sleeves are eccentric with each other by a predetermined amount in a diametric direction of the engine mount, before the instant engine mount is installed in place. These inner and outer sleeves 10, 12 are elastically connected to each other by a generally annular elastic member 14 of a rubber material formed therebetween.

The instant engine mount is installed such that one of the inner and outer sleeves 10, 12 is attached to one of a power unit and a body of the vehicle, while the other of the two sleeves 10, 12 is attached to the other of the power unit and the vehicle body, so that the power unit which includes an engine of the vehicle is elastically or flexibly mounted on the vehicle body. With the weight of the power unit acting on the elastic member 14, the inner and outer sleeves 10, 12 are disposed in substantially concentric or coaxial relationship with each other. The instant engine mount is adapted to damp and isolate primarily the vibrations which are applied thereto in a direction (vertical direction of FIG. 1) in which the axes of the two sleeves 10, 12 are offset from each other (before the engine mount is installed in place). This direction is hereinafter referred to as a "load-receiving direction" when appropriate. Upon application of the vibrational load, the elastic member 14 is elastically deformed in the load-receiving direction.

Figure 3:
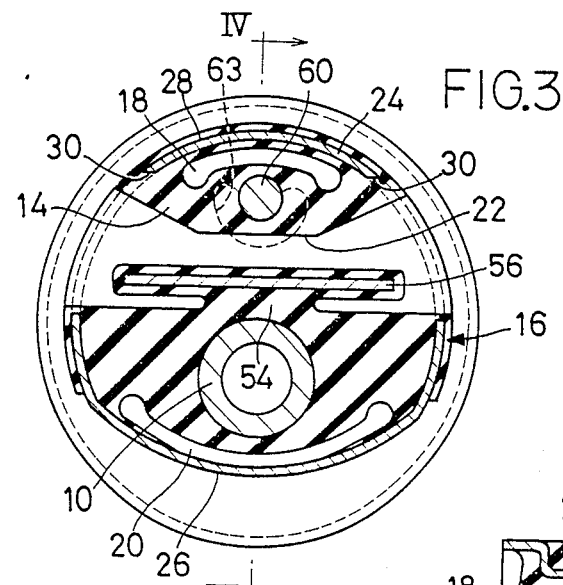
FIG. 3 is a cross sectional view corresponding to that of FIG. 1, showing an intermediate product including an elastic member formed in a vulcanization process during the manufacture of the engine mount.
Figure 4:
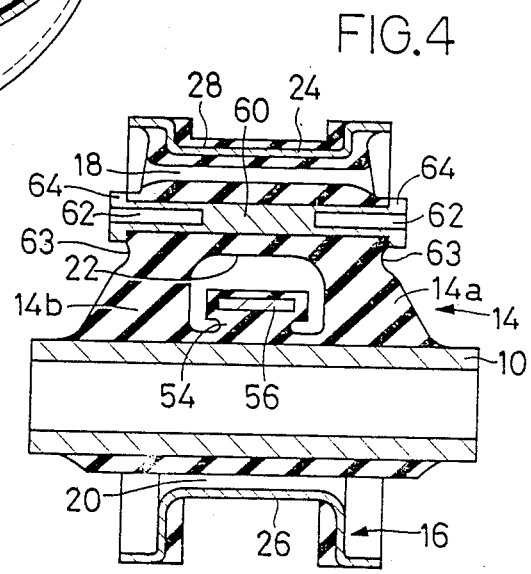
FIG. 4 is a cross sectional view taken along line IV—IV of FIG. 3.

The inner sleeve 10 having a relatively large wall thickness constitutes an intermediate product as shown in FIGS. 3 and 4, which is prepared during vulcanization of an unvulcanized rubber mass into the elastic member 14, in a suitable vulcanization mold. Described more particularly, the inner sleeve 10 and a substantially cylindrical, relatively thin-walled metallic sealing sleeve 16 are positioned relative to each other in the vulcanizing mold, such that the axes of the the inner sleeve 10 and the outwardly located sealing sleeve 16 are offset from each other in the load-receiving direction, as shown in FIGS. 3 and 4. With the unvulcanized rubber mass injected into the mold and vulcanized, there is formed the intermediate product wherein the elastic member 14 adheres to the outer circumferential surface of the inner sleeve 10 and the inner circumferential surface of the sealing sleeve 16.

The elastic member 4 has a first and a second substantially arcuate void 18, 20 formed in its axial direction, through respective outer circumferential portions thereof which are diametrically opposite to each other in the load-receiving direction of the bushing. The first arcuate void 18 is located on one of the diametrically opposite sides of the inner sleeve 10 on which the distance between the center of the inner sleeve and the circumference of the sealing sleeve 16 is larger than that on the other side. These arcuate voids 18, 20 are provided to adjust the elasticity of the elastic member 14. Further, a cavity 22 is formed through a portion of the elastic member 14, on the above-indicated one side of the inner sleeve 10, i.e., between the inner sleeve 10 and the first arcuate void 18. The cavity 22 extends through the elastic member 14, in a direction which is perpendicular to both the axial direction of the inner sleeve 10 and the load-receiving direction, i.e., that is, perpendicular to the vertical and horizontal directions as viewed in FIG. 2.

The sealing sleeve 16 has an axially intermediate small-diameter portion 24 which has a part-circumferential deep recess 26 on the side of the inner sleeve 10 corresponding to the second arcuate void 20, and a part-circumferential shallow recess 28 on the other side of the inner sleeve 10 corresponding to the first arcuate void 18. The deep recess 26 is formed by a suitable deep drawing operation on the small-diameter portion, such that the circumferential ends of the deep recess 26 terminate in the shallow recess 28. The sealing sleeve 16 further has a pair of windows 30, 30 formed through respective parts of the small-diameter portions 24 which partially define the shallow recess 28. The windows 30, 30 are aligned with the open ends of the cavity 22, whereby the cavity 22 is open through the windows 30 to the outside of the intermediate product of FIGS. 3 and 4.

To the intermediate product of FIGS. 3 and 4 consisting of the inner sleeve 10, elastic member 14 and sealing sleeve 16, first and second semi-cylindrical orifice-defining members 32, 34 and the outer sleeve 12 are assembled as illustrated in FIGS. 3 and 4, such that the orifice-defining members 32, 34 are fitted in the shallow and deep recesses 28, 26, respectively, so as to cooperate with each other to form a cylindrical orifice-defining member, while the outer sleeve 12 is fixedly fitted on the outer circumferential surface of the cylindrical orifice-defining member 32, 34, via a circumferential sealing rubber layer 48.

The open ends of the cavity 22 formed through the elastic member 14, and the corresponding windows 30, 30 formed through the sealing sleeve 16 are fluid-tightly closed by the first orifice-defining member 32, whereby a first fluid chamber n the form of a pressure-receiving chamber 36 is defined in the instant elastic bushing. On the other hand, the deep recess 26 of the sealing sleeve 16 is closed by the second orifice-defining member 34, whereby a second fluid chamber in the form of an equilibrium chamber 38 is defined in the elastic bushing. The pressure-receiving and equilibrium chambers 36, 38 are filled with a suitable non-compressible fluid such as water or polyalkylene glycol, in the manner described later.

Upon application of a vibrational load to the instant elastic bushing in the load-receiving direction (in which the inner and outer sleeves 10, 12 are eccentrically disposed), the inner sleeve 10 and the sealing sleeve 16 (outer sleeve 12) are displaced relative to each other with elastic deformation of the elastic member 14 in the load-receiving direction, whereby the pressure in the pressure-receiving chamber 36 is changed.

Figure 5:
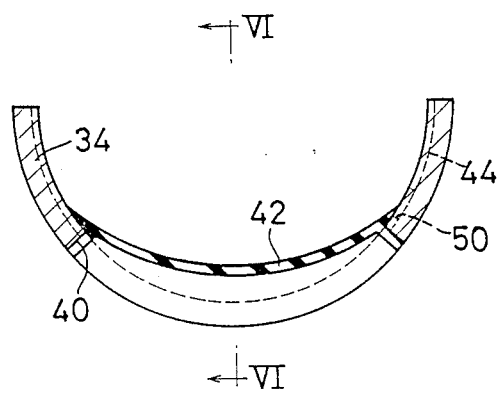
FIG. 5 is a cross sectional view of one of two orifice-defining members used in the engine mount.
Figure 6:
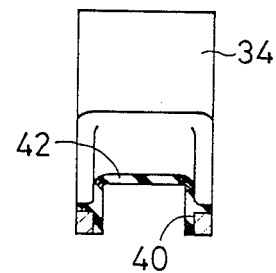
FIG. 6 is a cross sectional view taken along line VI—VI of FIG. 5.

The second orifice-defining member 34 accommodated in the deep recess 26 of the sealing sleeve 16 has a cutout 40 which is closed by a flexible diaphragm 42, which is secured by means of vulcanization to the periphery of the cutout 40 as illustrated in FIGS. 5 and 6. That is, the flexible diaphragm 42 partially defines the equilibrium chamber 38, so that the volume of the chamber 38 is variable due to elastic deformation or displacement of the diaphragm 42. The outer sleeve 12 and the flexible diaphragm 42 define therebetween an air chamber 52 which permits the diaphragm 42 to be displaced.

The cylindrical member consisting of the orifice-defining members 32, 34 has two parallel part-circumferential grooves 44, 44 formed in the outer circumferential surfaces. These grooves 44, 44 communicate with the pressure-receiving and equilibrium chambers 36, 38, through through-holes 50, 50 formed through the orifice-defining members 32, 34. The grooves 44, 44 are closed by the inner circumferential surface of the sealing rubber layer 48 formed on the inner circumferential surface of the outer sleeve 12, whereby two orifice passages 46, 46 are provided for fluid communication between the pressure-receiving and equilibrium chambers 36, 38.

The assembling of the orifice-defining members 32, 34 and the outer sleeve 12 onto the intermediate product of FIGS. 3 and 4 which includes the elastic member 14 is conducted within a mass of the selected non-compressible fluid, so that the fluid chambers 36, 38 and the orifice passages 46, 46 are filled with the non-compressible fluid in the assembling process. The outer sleeve 12 is then subjected to a suitable drawing operation to give the elastic member 14 a suitable amount of radially inward pre-compression.

When the instant elastic bushing or engine mount is subjected to a vibrational load, the inner and outer sleeves 10, 12 are displaced relative to each other in the load-receiving direction, and the fluid pressure in the pressure-receiving chamber 36 is accordingly changed, whereby the fluid is forced to flow between the pressure-receiving and equilibrium chambers 36, 38, through the orifice passages 46. As a result, the input vibrations in a frequency range to which the cross sectional area and length of the orifice passages 46 are tuned may be damped or isolated with the damping coefficient of the engine mount being suitably reduced, based on the resistance of the orifice passages 46 to the fluid flows therethrough or based on resonance of the fluid masses in the chambers 36, 38 and passages 46. Usually, the orifice passages 46 are tuned to effectively damp the vibrations of relatively low frequencies such as the engine shake.

As indicated above, the sealing rubber layer 48, which is formed on the entire inner circumferential surface of the outer sleeve 12 in pressed contact with the outer surfaces of the orifice-defining members 32, 34 and sealing sleeve 16, assures fluid tightness of the pressure-receiving chamber 36, equilibrium chamber 38 and orifice passages 46.

In the present engine mount, the elastic member 14 is formed with an integral rubber support 54 which extends radially outwardly from the inner sleeve 10 by a suitable distance into the pressure-receiving chamber 36, as shown in FIGS. 1 and 2. To this rubber support 54 is secured a rectangular wing plate 56 which is formed and positioned so as to substantially divide the volume of the pressure-receiving chamber 36 into two sections that are spaced apart from each other in the load-receiving direction of the engine mount. However, the two sections of the chamber 36 communicate with each other through a rectangular annular restricted portion 58 which is formed between the periphery of the wing plate 56 and the inner surfaces of the first orifice-defining member 32 and the elastic member 14. The wing plate 56 is covered by a thin rubber coating formed integrally with the elastic member 14.

When the inner and outer sleeves 10, 12 are displaced relative to each other in the load-receiving direction (in which the axes of the two sleeves are offset from each other), the non-compressible fluid is forced to flow from one of the two sections of the pressure-receiving chamber 36 into the other section, through the restricted portion 58, in the load-receiving direction. Consequently, the input vibrations in a medium- and high-frequency range can be effectively isolated, with the spring constant of the engine mount being suitably reduced, based on the resistance of the restricted portion 58 to the fluid flows therethrough or based on resonance of the fluid masses in the two divided sections of the pressure-receiving chamber 36. Usually, the dimensions and configuration of the restricted portion 58 are adjusted or tuned so as to effectively isolate the vibrations such as booming noise and conducted engine noise of a medium- and high-frequency range. Thus, the vibration transmissibility of the engine mount is lowered by the restricted portion 58 of the pressure-receiving chamber 36.

The present engine mount incorporates a restrictor rod 60 for limiting the amount of elastic deformation of the axial end portions 14a, 14b of the elastic member 14 which define the opposite ends of the pressure-receiving chamber 36 as viewed in the axial direction of the bushing. Described more particularly, the restrictor rod 60 having a generally cylindrical shape is disposed so as to extend through a portion of the elastic member 14 between the first arcuate void 18 and the pressure-receiving chamber 36, in the axial direction of the engine mount, as also shown in FIGS. 3 and 4. The restrictor rod 60 is fixedly positioned in the mass of the elastic member 14 in the vulcanization process of the elastic member 14. The rod 60 has holes 62 formed in the opposite axial end portions. These holes 62 are used to position and retain the restrictor rod 60 in the vulcanization mold, relative to the inner sleeve 10 and sealing sleeve 16.

As indicated in FIGS. 2 and 4, the restrictor rod 60 has radially outwardly extending flanges 64 at its axial ends which are exposed protruding from the axial end faces of the elastic member 14. These flanges 64 are secured at their inner surfaces to the axial end faces of the elastic member 14, in order to increase the bonding strength of the restrictor rod 60 to the elastic member 14 and prevent displacement of the rod 60 relative to the elastic member 14 due to shearing stresses. The axial end faces of the elastic member 14 have recesses 63 formed around a half of the circumference of the respective flanges 64 of the restrictor rod 60, so that shearing stresses exerted on the axial end portions of the elastic member 14 may be released.

The restrictor rod 60 is formed of a material which has a higher degree of hardness than the material of the elastic member 14, so that the rod 60 may effectively restrict or limit the elastic deformation of the axial end portions of the elastic member 14, particularly in the axial direction, which deformation is caused by static and dynamic loads applied to the engine mount. While the restrictor rod 60 may be formed of a relatively rigid material, it is preferable to use an elastic material such as a hard rubber material having a certain degree of elasticity, in order to prevent the restrictor rod 60 from being separated from the joining surface of the elastic member 14, and to avoid cracking of the elastic member 14 at the interface with the restrictor rod 60.

In the present cylindrical engine mount, the restrictor rod 60 functions to restrict or limit the amount of axial elastic deformation of the elastic member 14, particularly of a portion of the elastic member 14 defining the pressure-receiving chamber 36, which deformation arises due to the application of the static initial load to the engine mount, that is, the weight of the power unit acting on the engine mount after the engine mount is installed in position between the power unit and the vehicle body. Thus, the restrictor rod 60 reduces the influence of the weight of the power unit on the amount of the axially outward expansion of the axial end portions of the elastic member 14 which define the opposite ends of the pressure-receiving chamber 36 as viewed in the axial direction of the bushing. Consequently, the restrictor rod 60 serves to reduce or limit the amount of change in the dimensions and configuration of the restricted portion 58 of the pressure-receiving chamber 36, which occurs due to the weight of the power unit.

In other words, the restrictor rod 60 functions to effectively minimize the amount of change in the frequency range of the vibrations to which the restricted portion 58 is tuned to isolate, when the weight of the power unit is exerted on the engine mount upon installation of the power unit on the vehicle body by means of the instant engine mount. Thus, the restricted portion 58 maintains its intended vibration isolating function, with respect to the vibrations in the predetermined medium and high frequency range, based on the resonance of the fluid masses which are forced to flow through the restricted portion 58, even with the weight of the power unit acting on the elastic member 14.

The restrictor rod 60 is also effective to restrict the amount of elastic deformation or strain of the elastic member 14 when the engine mount receives an excessively large dynamic load, i.e., a vibrational load having a large amplitude. Thus, the rod 60 serves to improve the durability of the elastic member 14 and the life expectancy of the engine mount.

In the present engine mount, the flexible diaphragm 42 partially defining the equilibrium chamber 38 also has improved durability, since the amount of deformation or displacement of the diaphragm 42 is limited by the outer sleeve 12 and the sealing sleeve 16. In this respect, too, the life expectancy of the engine mount is prolonged.

While the present invention has been described in its presently preferred embodiment with a certain degree of particularity, by way of example only, it is to be understood that the invention is by no means confined to the details of the illustrated embodiment.

The engine mount according to the illustrated embodiment has two fluid chambers, that is, the pressure-receiving chamber 36 and the equilibrium chamber 38 which are disposed on the diametrically opposite sides of the inner sleeve 10 in the load-receiving direction. However, the principle of the present invention is equally applicable to a fluid-filled elastic bushing which has only one fluid chamber, or a plurality of fluid chambers that are not limited to the illustrated two chambers 36, 38. An engine mount which does not have an equilibrium chamber is disclosed in U.S. Pat. No. 4,749,174.

While the illustrated embodiment uses the restrictor rod 60 as the restrictor member for limiting the elastic deformation of the elastic member 14, the details of the restrictor member in terms of the size and configuration, and the location and manner of fixing relative to the elastic member 14 are not limited to those in the illustrated embodiment. For instance, the restrictor member may be a hollow member for reduced weight, or may have projections and/or recesses on the outer surface, in order to increase the bonding strength to the elastic member 14. The restrictor member may be disposed so as to extend through the pressure-receiving chamber 36, or may be entirely embedded within the mass of the elastic member 14, without the axial ends exposed.

Further, the details of the fluid chambers 36, 38, orifice passages 46, wing plate 56 and other components may be suitably modified, provided that the restrictor member is provided to limit the elastic deformation of the elastic member 14 for the purposes discussed above.

Although the illustrated embodiment is adapted to be used as an engine mount for a motor vehicle, the concept of the present invention is applicable to various types of fluid-filled elastic bushing or mount for elastically connecting two members of a vibration system.

It will be understood that the present invention may be embodied with various other changes, modifications and improvements, which may occur to those skilled in the art, in the light of the foregoing teaching, without departing from the spirit and scope of the invention defined in the following claims.

What is claimed is:

1. A fluid-filled elastic bushing for damping or isolating a vibrational load, comprising:
    an inner sleeve and an outer sleeve disposed radially outwardly of said inner sleeve;
    a generally annular elastic member formed between and elastically connecting said inner and outer sleeves, so as to provide an assembly having a plurality of fluid chambers which are spaced apart from each other in a circumferential direction of said sleeves and are filled with a non-compressible fluid, said assembly further having orifice means for fluid communication between said fluid chambers;
    a wing member disposed in at least one of said plurality of fluid chambers to which the vibrational load is applied, said wing member being supported by one of said inner and outer sleeves and said elastic member, said wing member cooperating with said assembly to define a restricted portion within each of said at least one fluid chamber; and
    a restrictor member fixedly disposed so as to extend in a portion of said elastic member in an axial direction of the elastic bushing, for limiting axial elastic deformation of said elastic member at axial end portions thereof which define opposite ends of said each fluid chamber as viewed in said axial direction of the elastic bushing, and minimizing changes to the restricted portion.

2. A fluid-filled elastic bushing according to claim 1, wherein said restrictor member is formed of an elastic material having a higher hardness than said elastic member.

3. A fluid-filled elastic bushing according to claim 1, wherein said restrictor member extends through said elastic member and has radially outward flanges at opposite axial ends thereof, said flanges being held in contact with outer surfaces of said axial end portions of said elastic member.

4. A fluid-filled elastic bushing according to claim 1, wherein said plurality of fluid chambers include a pressure-receiving chamber in which said wing member is disposed, and an equilibrium chamber which is partially defined by a flexible diaphragm.

5. A fluid-filled elastic bushing according to claim 4, wherein said equilibrium chamber is located opposite to said pressure-receiving chamber diametrically of said inner sleeve.

6. A fluid-filled elastic bushing according to claim 4, wherein said elastic member has a void formed between said pressure-receiving chamber and said outer sleeve as viewed in a direction in which said vibrational load is applied to said pressure-receiving chamber.

7. A fluid-filled elastic bushing according to claim 6, wherein said restrictor member is disposed in a portion of said elastic member which is located between said pressure-receiving chamber and said void.

* * * * *